US009566522B2

(12) United States Patent
Holm et al.

(10) Patent No.: US 9,566,522 B2
(45) Date of Patent: Feb. 14, 2017

(54) DEVICE, METHOD, AND COMPUTER PROGRAM PRODUCT FOR CUSTOMIZING GAME FUNCTIONALITY USING IMAGES

(75) Inventors: Jukka A. Holm, Tampere (FI); Matti S. Hamalainen, Lempaala (FI); Kai Havukainen, Lempaala (FI); Heikki Waris, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1600 days.

(21) Appl. No.: 11/140,377

(22) Filed: May 27, 2005

(65) Prior Publication Data

US 2006/0281511 A1    Dec. 14, 2006

(51) Int. Cl.
| | |
|---|---|
| A63F 13/10 | (2006.01) |
| A63F 9/24 | (2006.01) |
| A63F 13/655 | (2014.01) |
| A63F 13/52 | (2014.01) |
| A63F 13/40 | (2014.01) |
| H04N 5/232 | (2006.01) |

(52) U.S. Cl.
CPC ............ *A63F 13/655* (2014.09); *A63F 13/10* (2013.01); *A63F 13/52* (2014.09); *A63F 2300/695* (2013.01); *H04N 5/23222* (2013.01)

(58) Field of Classification Search
CPC .................. A63F 2300/6018; A63F 2300/695; H04N 5/262; H04N 5/23222
USPC ............................................. 463/32; 345/419
See application file for complete search history.

(56) References Cited

U.S. PATENT DOCUMENTS

| 6,607,446 B1 | 8/2003 | Shimomura et al. |
| 6,699,123 B2 | 3/2004 | Matsuura et al. |
| 6,758,756 B1 | 7/2004 | Horigami et al. |
| (Continued) | | |

FOREIGN PATENT DOCUMENTS

| WO | WO 9846323 A1 * | 10/1998 | ............... A63F 9/22 |
| WO | WO 2005/031627 A1 | 4/2005 | |

OTHER PUBLICATIONS

*Attack of the Killer Virus*; 2004; Ojom; © 2004 Ojom GmbH, © Elocom; 1 page; available at <http://www.ojom.com/g_killer_virus.html> (visited May 16, 2005).

(Continued)

*Primary Examiner* — James S McClellan
*Assistant Examiner* — Syvila Weatherford
(74) *Attorney, Agent, or Firm* — Ditthavong & Steiner, P.C.

(57) ABSTRACT

A gaming device, method, and computer program product customize an electronic game using features of an image file, such as may be created by a digital camera or similar device. A gaming device comprises a processor capable of receiving an image file, extracting at least one feature from the received image file, and modifying the electronic game based on the extracted feature. The processor may modify the electronic game by adding a game object corresponding to the extracted feature. Alternatively, the processor may modify the electronic game by modifying a game object based on the extracted feature. The image file may be created by the gaming device or may be received from an external device. The extracted feature may be selected from the group comprising shape, size, location, orientation, color, and contrast. The processor may be further capable of preprocessing the image file.

32 Claims, 5 Drawing Sheets

(56) References Cited

U.S. PATENT DOCUMENTS

| | | | |
|---|---|---|---|
| 2001/0037181 | A1 | 11/2001 | Matsuura et al. |
| 2001/0048762 | A1 | 12/2001 | Matsuura et al. |
| 2001/0051541 | A1 | 12/2001 | Matsuura et al. |
| 2002/0072411 | A1 | 6/2002 | Matsuura et al. |
| 2002/0082082 | A1* | 6/2002 | Stamper et al. ............... 463/32 |
| 2002/0101423 | A1 | 8/2002 | Matsuura et al. |
| 2002/0103023 | A1 | 8/2002 | Matsuura et al. |
| 2004/0137984 | A1 | 7/2004 | Salter |
| 2004/0206227 | A1 | 10/2004 | Cheng |
| 2006/0223635 | A1* | 10/2006 | Rosenberg ..................... 463/37 |

OTHER PUBLICATIONS

*Mosquitos*; 2004; Ojom; © 2004 Ojom GmbH, © CE Entertainment Media; 1 page; available at <http://www.ojom.com/g_mosquito.html>; (visited May 16, 2005).
*Final Fantasy VII: Before Crisis (Cell)*; 2004 TokyoGameShow/Previews; 2 pages; available at <http://www.wireless.gamespy.com/wireless/before-crisis-final-fantasy-vii/550235pl.html> ; (visited May 16, 2005).
Anoop Gantayat; *Hands on: Before Crisis Final Fantasy VII*; Aug. 2004; 4 pages; available at <http://www.wireless.ign.com/articles/543/543629pl.html> ; (visited May 16, 2005).
*Vib Ripple*; IGN; 4 pages; available at <http://www.ps2.ign.com/objects/661/661950.html> ; (visited May 16, 2005).
Justin Hall; *Playing with Mobile Media—Tokyo Game Show 2004*; Sep. 2004; 2 pages; available at <http://www.thefeature.com/print?araticleid=101102> ; (visited May 16, 2005).
*MonsterHunt—Demo 1.1.0*; Digia Software; May 2005; 1 page; available at <http://www.symbiangear.com/product.html?pid=7789,7793,24915> ; (visited May 16, 2005).

\* cited by examiner

DEVICE, METHOD, AND COMPUTER PROGRAM PRODUCT FOR CUSTOMIZING GAME FUNCTIONALITY USING IMAGES

FIELD OF THE INVENTION

Exemplary embodiments of the present invention generally relate to systems and methods of operating an electronic game and, more particularly, relate to devices, methods, and computer program products for customizing game functionality using an image file.

BACKGROUND OF THE INVENTION

Playing electronic games is a popular pastime, and continues to grow in popularity as more devices, particularly mobile devices, are created to facilitate gaming. Many mobile devices, such as mobile (e.g., cellular) telephones and personal digital assistants (PDAs), are capable of executing gaming applications. Additionally, dedicated mobile gaming devices have been created. These mobile gaming devices allow users to participate in electronic games away from the user's personal computer. When the mobile gaming devices are connected via a wireless network, the user is able to participate in multi-player electronic games away from the user's personal computer and wired network connection.

For purposes of this application, the term "gaming device" will be used to refer to all devices capable of executing gaming applications, whether the device is a personal computer, a cellular telephone, a PDA, a gaming console, a dedicated mobile gaming device, or any other type of device, whether multi-player or single player, whether connected to a network or not, and if connected to a network, whether the network is the Internet, a cellular telephone network, or any other type of network, and whether the communication with the network is wired or wireless.

Users of gaming devices often spend a great deal of time playing the electronic games. The users may become very familiar with a particular electronic game, such that the user can anticipate the action of the game before an event occurs in the game. Such familiarity may cause the user to become bored with a game. One method of preventing such boredom is to frequently acquire new games to play. There are several problems with this solution. New games may have to be purchased and it may be expensive to purchase many new games. Adding new games to a gaming device requires that the gaming device have available memory to store the game. The new games may need to be downloaded from a network, such as the Internet. Depending on the bandwidth of the network connection to which the gaming device is connected, it may take a long time to download a new game. A game developer or third party may create and sell additional game levels or extension packs that may be used to modify an existing game. These additional game levels and extension packs may also be expensive to purchase. Finally, while the user may be bored with a certain game, the user may also enjoy that particular game and may not desire to learn a new game.

Another method of preventing such boredom is to customize a game. Games, whether single- or multi-player and regardless of the game genre, usually come with a set of features such as game maps and/or scenarios. Some games include the ability to create new and customized features which may then be incorporated into future game play. These new or extension maps and/or scenarios are often developed and distributed by the developer of the game or by the users (players) of the game. Games played using mobile gaming devices have often been used for spending some idle time, while games played on personal computers and game consoles (collectively termed fixed games) often involve extensive and complicated development of game characters and/or achievement of a ranking in a gaming community. As a result, users of such fixed games may be more likely to develop extension maps and scenarios and share the developed features with other users. Conversely, the effort by members of the gaming community to create game maps and scenarios may not happen for the mobile games on the same scale as with fixed games.

Furthermore, the development of maps and scenarios usually require special development tools, and may be time consuming. While the maps and scenarios in games executing on mobile gaming devices might be simpler than for fixed games, the development in the mobile terminal itself is often quite difficult because of the hardware and software limitations of such a mobile device.

As such, there is a need for a gaming device, method, and computer program product for quickly and easily customizing electronic games, thereby enabling users of such games to add new features that may restore the user's interest in a familiar game.

BRIEF SUMMARY OF THE INVENTION

A gaming device, method, and computer program product are therefore provided that, in accordance with one embodiment, customize an electronic game using features of an image file, such as may be created by a digital camera or similar device.

In one exemplary embodiment, a gaming device comprises a processor capable of receiving an image file, extracting at least one feature from the received image file, and modifying the electronic game based on the extracted feature. The processor may modify the electronic game by adding a game object corresponding to the extracted feature. Alternatively, the processor may modify the electronic game by modifying a game object based on the extracted feature.

The gaming device may further comprise an image capture device capable of creating the image file. In an alternative exemplary embodiment, the gaming device may further comprise a communication interface capable of receiving the image file from an external device. The extracted feature may be selected from the group comprising shape, size, location, angle, viewing angle, orientation, color, brightness, and contrast.

In one embodiment, the processor is further capable of preprocessing the image file. In this regard, preprocessing the image file may include at least one of changing from color to black and white, adjusting contrast, adjusting brightness, filtering, scaling, rotating, creating a mirror image, or creating a negative image.

The processor of the gaming device may be further capable of storing a modification of the electronic game, and transferring a modification of the electronic game to another gaming device. The processor may be further capable of using an error correction function to extract at least one feature when the processor is unable to locate a desired feature within the image file.

In one embodiment, the processor is further capable of selecting one feature to extract when the image file contains two or more extractable features. In this regard, the processor may be further capable of using input from a user to select the one feature to extract.

In addition to the gaming device for customizing functionality of an electronic game as described above, other aspects of the present invention are directed to corresponding methods and computer program products for customizing functionality of an electronic game.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Exemplary embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
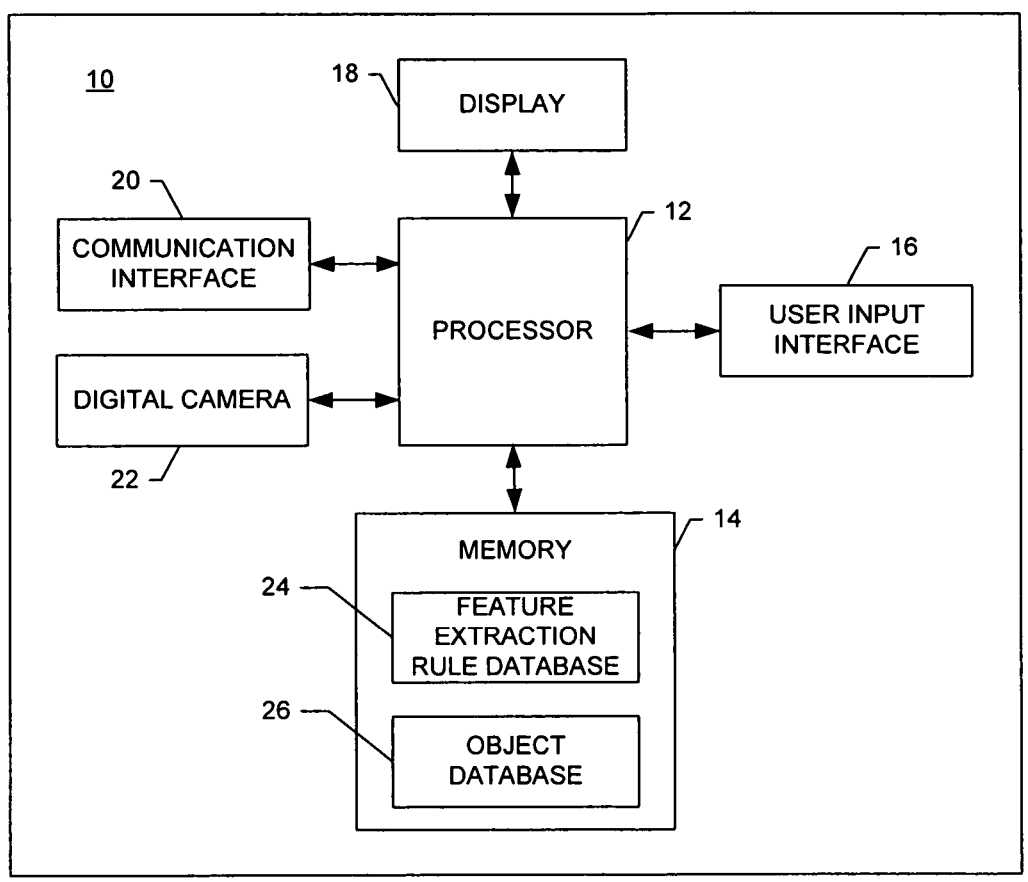
FIG. 1 is a schematic block diagram of an entity capable of operating as a gaming device, in accordance with embodiments of the invention.

Referring now to FIG. 1, a block diagram of an entity capable of operating as a gaming device is shown, in accordance with one embodiment of the present invention. The gaming device 10 of FIG. 1 may be any device capable of executing electronic gaming applications, whether the device is a personal computer, a mobile telephone, a PDA, a gaming console, a dedicated mobile gaming device, or any other type of device. As shown, the entity capable of operating as a gaming device 10 generally includes a processor 12 capable of executing a gaming application. While the processor can be configured in various manners, the processor may be comprised of a microprocessor, controller, dedicated or general purpose electronic circuitry, a suitably programmed computing device, or other means for executing a gaming application. The processor 12 may also be capable of executing other applications, depending on the specific device used as gaming device 10. For example, if gaming device 10 is a PDA, then processor 12 may be capable of executing personal organization applications, such as scheduling, calendar, and address book applications. If gaming device 10 is a cellular telephone, then processor 12 may be capable of executing communication applications, such as telephony, email, or text messaging applications.

Processor 12 may also be capable of customizing functionality of an electronic game. In this regard, processor 12 may be capable of receiving an image file, extracting at least one feature from the received image file, and modifying the electronic game based on the extracted feature. Processor 12 may modify the electronic game by adding a game object corresponding to the extracted feature. Alternatively, processor 12 may modify the electronic game by modifying a game object based on the extracted feature. Processor 12 may be further capable of preprocessing the image file, such as by performing at least one of changing from color to black and white, adjusting contrast, adjusting brightness, filtering, scaling, rotating, creating a mirror image, or creating a negative image.

Processor 12 may be connected to or otherwise capable of accessing a memory 14. The memory can comprise volatile and/or non-volatile memory or other storage means, and typically stores content, applications, data, or the like. For example, the memory typically stores content transmitted from, and/or received by, the gaming device. Additionally, the memory 14 may store a feature extraction rule database 24 and an object database 26, discussed in detail below. The memory 14 may store one or more image files, which may be created by the user of gaming device 10 or created by other users and transferred to the user of gaming device 10. The memory 14 may also store created game customizations for future game play or to transfer to other users, as discussed below. Also for example, the memory typically stores client applications, instructions or the like for the processor to perform steps associated with operation of the gaming device in accordance with exemplary embodiments of the invention. As explained below, the memory can store client application(s) including a configuration utility, content manager and/or display manager. In this regard, when executed, the configuration utility may function to configure a source of content to receive or otherwise provide content. The content manager, when executed, may function to manage the receipt of content from the source, and/or the use of content received from the source. And the display manager may function to manage presentation of content received from the source. As described herein, the client application(s) each comprise software operated by the gaming device. It should be understood, however, that any one or more of the client applications described herein can alternatively comprise firmware or hardware, without departing from the spirit and scope of the invention. Moreover, while described as separate applications, one or more of these applications may be integrated into a single application.

In addition to the memory 14, the processor 12 may also be connected to at least one interface or other means for transmitting and/or receiving data, content or the like. In this regard, the interface(s) can include at least one communication interface 20 or other means for transmitting and/or receiving data. The image file that may be used by the processor 12 may be received from an external device through the communication interface 20. The image file may also be received from another user through the communication interface 20. Additionally, game customizations created by other users, as discussed below, may be received through the communication interface. The communication interface 20 may communicate with and receive data from external devices using any known communication technique, whether wired or wireless, including but not limited to serial, universal serial bus (USB), Ethernet, Bluetooth, wireless Ethernet (i.e., WiFi), cellular, infrared, and general packet radio service (GPRS).

Alternatively, the gaming device may include a digital camera 22 or similar image-capturing device, such that the image file is created within the gaming device from an image captured by the digital camera.

The processor may also be connected to at least one user interface that may include a display 18 and/or a user input interface 16. The user input interface, in turn, may comprise any of a number of devices allowing the gaming device to receive data and/or commands from a user, such as a keypad, a touch display, a joystick or other input device.

Figure 2:
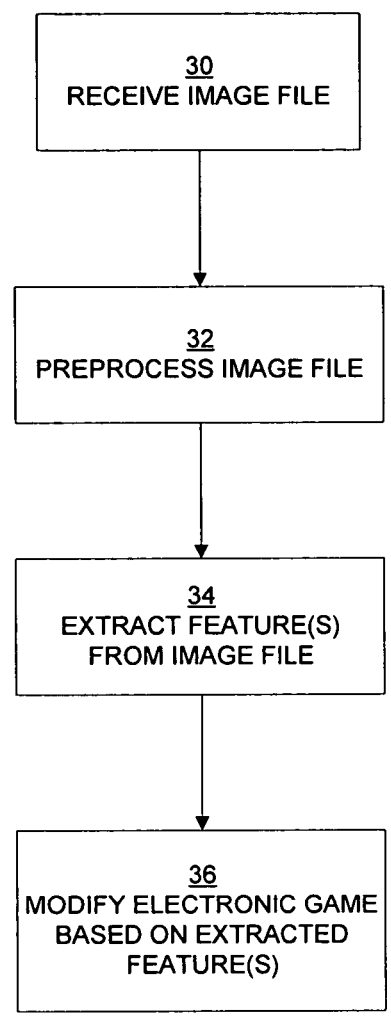
FIG. 2 is a flowchart of the operation of customizing functionality of an electronic game, in accordance with an exemplary embodiment of the invention.

Referring now to FIG. 2, a flowchart of the operation of customizing functionality of an electronic game is illustrated, in accordance with one exemplary embodiment of the invention. An image file is received, such as by a processor of a gaming device. See block 30. The image file may be formatted in any known image format, such as bitmap (BMP), Graphics Interchange Format (GIF), JPEG, Tag Image File Format (TIFF), or the like. The image file may be created within a gaming device, such as by a digital camera integral with the gaming device. Alternatively, the image file may be created using a device that is separate from the gaming device and then transferred to the gaming device. Any device capable of creating an image file may be used, such as a digital camera, personal computer, PDA, or digital pen. When the image file is created using a separate device, the image file may be transferred by any suitable method of transferring data files between devices, such as via a storage medium (e.g., a memory stick), a network (e.g., the Internet), or a messaging system (e.g., email). The image file may be stored within the gaming device, either as received or created or after some processing has been performed on the image file. Storing the image file enables the user to perform the customization some period of time after the image file has been received or created. The contents of the image file (i.e., the image) may vary, depending on the device used to create the image file, the intended use of the image file, the requirements of the electronic game, and the desires of the user creating the image file. The image may be an unaltered object, landscape, cityscape, etc. that may be photographed by a digital camera to create the image file. The image may be an object that was purposely obtained, positioned, and photographed with a digital camera by the user to create an image file for the purpose of customizing an electronic game. Common everyday objects having desired features (e.g., shape, color, contour, outline, etc.) may be positioned and photographed to create the image file. Examples of common objects that may be used include coins, paper currency, business cards, postage stamps, bottle caps, cigarette boxes, bottles, cans, and the like. The object may be placed on a horizontal surface and photographed from directly above the object (i.e., with the camera line of sight perpendicular to the horizontal surface), such that the two dimensional outline of the object may be captured. Alternatively, the object may be placed on a horizontal surface but photographed from a location not directly above the object (i.e., with the camera line of sight at an acute angle relative to the horizontal surface), such that the three dimensional aspects of the object may be captured and thereby enabling the position of the camera (and therefore the user) relative to the object to be determined. The image may be a drawing created by the user. Such a drawing may be created electronically, such as by using a digital pen or drawing/drafting software. Such a drawing may also be hand drawn, with the image file then created from the drawing by scanning or digitally photographing the drawing.

The image file may be preprocessed by the processor after being received by the gaming device, depending on the image quality and characteristics. See block 32. Alternatively, the preprocessing may be performed by a device separate from the gaming device, with the preprocessed image file then being received by the gaming device. Preprocessing the image file will typically involve changing one or more image characteristics to better enable the image file to be used to customize the game. For example, a color image such as may be created with a digital camera may be changed to a black and white image. The contrast of the image file may be adjusted to increase the differentiation between light areas and dark areas of the image. The brightness may be adjusted to brighten a dark image. The image may be scaled up or down to create an image of the appropriate size. The image may be rotated. A mirror image may be created of the image. A negative image may be created, such that light areas of the image become dark and dark areas become light. A fuzzy or out-of-focus image may be sharpened. Preprocessing may involve geometrical image correction, such as geometry warping and/or correction of camera geometry. Preprocessing may involve one or more of the above described techniques and/or any suitable technique(s) for changing image characteristics.

The image file may be analyzed by the processor such that one or more features may be extracted from the image file. See block 34. The features that may be extracted from the image file may vary depending on the requirements of the electronic game. Such features may include predefined, game-specific shapes, such as circles and arrows, which may be present in an image. Other features may include the color(s) within the image or the contrast level of the image. Other features may include angles which may be present in the image. For example, the processor may extract one or more angles from an object in the image. Alternatively, where the three dimensional shape of the object in the image is known by the processor (e.g., a cigarette box is a rectangular parallelepiped), the processor may determine the angle at which the object was photographed. The memory and, more commonly, a feature extraction rule database may store predefined features, such as by storing shape descriptors, which the processor may compare with an image to identify, locate, and extract features that match the shape descriptors from within the image. The features of the feature extraction rule database may be parameterized to support features having different size/scale, color, contrast, etc. to enable robust feature extraction for the desired customization. The rule database may include game-specific information, such as what shapes may be extracted for a specific game, and for a specific purpose within a specific game.

Although not illustrated in FIG. 2, the processor may employ an error correction function in conjunction with the feature extraction. The error correction function may be used when the feature extraction function is unable to find a desired feature in an image. For example, the feature extraction function may attempt to find a circle within an image but may be unable to do so. However, if an object is identified that is nearly a circle, such as a 270 degree arc, then the error correction function may recognize that the object is close enough to a circle to be used to extract a circle from the image. Error correction functions can be implemented in several ways depending on the nature of the feature extraction problem of the game application. The error correction function can be implemented using any known pattern recognition or image processing technique, including but not limited to deterministic or statistical geometrical feature extraction techniques, moment-based feature methods, transform domain techniques, morphological image processing methods, structural or syntactic feature representation techniques, neural networks, or any heuristic methods familiar to those skilled in the art.

Some portions of the image in the image file may not be recognized and extracted, typically because the image portion does not correspond to a feature in the feature extraction rule database or because the image portion was captured in error (e.g., as a result of a reflection or lint on the camera lens). In one exemplary embodiment, portions of the image that are not recognizable may be disregarded. In an alternative exemplary embodiment, portions of the image that are not recognizable may be used by the processor to randomly generate game settings or game objects. Some image files may contain a greater number of features or drawing objects than may be used to customize the game. For example, it may be desirable to extract a circle from the image file to locate a ball in the game. However, the image file may contain two or more circles, such that the processor may not know which circle to use to locate the ball. In one exemplary embodiment, the user may be prompted to select the desired feature or object to be used to customize the game. In an alternative exemplary embodiment, the processor may randomly select one feature or object from among the identified features or objects and use the randomly selected one to customize the game.

When a feature has been extracted from the image, the processor may use the feature to customize the electronic game. See block 36. This may be accomplished by mapping the extracted feature to an object in the electronic game. Such mapping may be done using an object database stored, for example, in memory. The object database may include cross-references between features that may be extracted from image files and game objects that may correspond to such features. For example, the object database may indicate that an extracted circle may be mapped to a ball within the game, such that the location of the circle within the image may be used to position the ball within the game. The object database for a racing-type game may indicate that an extracted triangle may be mapped to a tree that may be used to customize the scenery within the game. The object database may indicate that a continuous line may be mapped to a racetrack of a racing-type game. The object database may be capable of storing several different parameters for a game object, such as height, width, color, thickness, etc., such that different aspects of the extracted feature may correspond to different parameters of the game object.

Features that have been extracted from an image may be used in several different ways to customize an electronic game. Part or all of an extracted feature, or several features together, may be used as a gameworld (i.e., the background, environment or setting of the game; also termed milieu or gameboard) or to generate a gameworld. For example, the shape of a feature may be used to generate a gameworld that has a contour that corresponds to the shape of the feature. Part or all of an extracted feature, or several features together, may be used as a game object or to generate one or more game objects. For example, an extracted circle may be used to create a ball within the game and an extracted triangle may be used to create a tree. Extracted features may also be used to create characters (also termed avatars) within the game. A two dimensional extracted feature may be projected onto a three-dimensional game object, such as a sphere, cylinder, or human facial geometry. Where the angle at which an object in the image was photographed may be determined by the processor (as discussed above), this angle may be used to customize the display of the game such as by mapping this extracted angle to the displayed viewpoint of the game. For example, the display of a rally game may be from a viewpoint directly above (i.e., perpendicular to) the racetrack or the display may be from a viewpoint that is a forty-five degree angle relative to the racetrack and from behind the player's car, depending upon the extracted angle. A single feature or multiple features may be extracted from an image file. A single image file or multiple image files may be used to customize a game. If multiple image files are used, the multiple image files may be used sequentially or concurrently. For example, a different image file may be used for each level of play of a game, thereby enabling different customizations at each level. Alternatively, features may be extracted from several different image files prior to game play to be used to customize the game. The method of customizing an electronic game may be performed before the user begins to play the game, such that all desired customizations are made prior to game play. Alternatively, the method of customizing an electronic game may be performed repeatedly prior to and during game play, such that multiple customizations are made to a game while the game is being played. These multiple customizations may be made sequentially, or several customizations may occur concurrently. Even if customizations are made during game play, one or more steps of the method illustrated by FIG. 2 may be performed prior to game play. For example, one or more image files may be received and preprocessed prior to the start of game play, and the feature extraction and customization may occur during game play.

In addition to extracting one or more features from an image file, the image itself or a portion of the image contained in the image file may be used in the game, such as by transferring the image (without mapping to an object) into the game, for example as background or scenery.

Figure 3A:
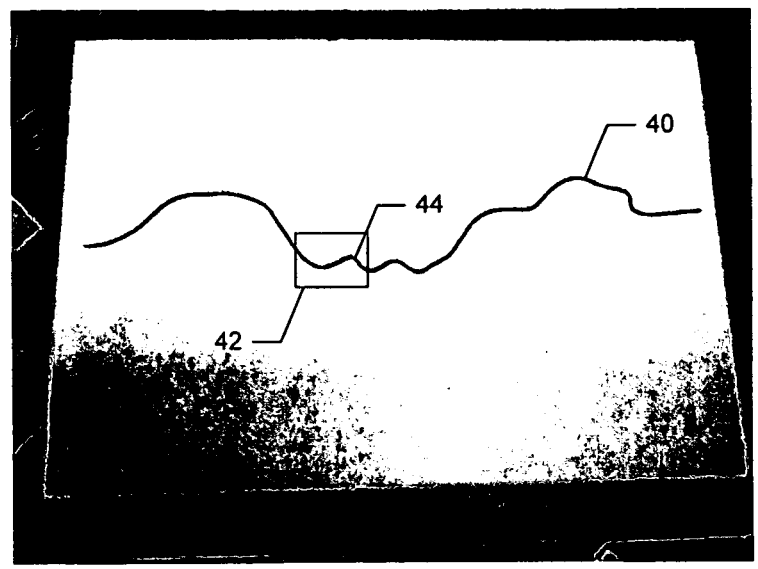
FIGS. 3A and 3B illustrate customization of a platform game, in accordance with an exemplary embodiment of the invention.
Figure 3B:
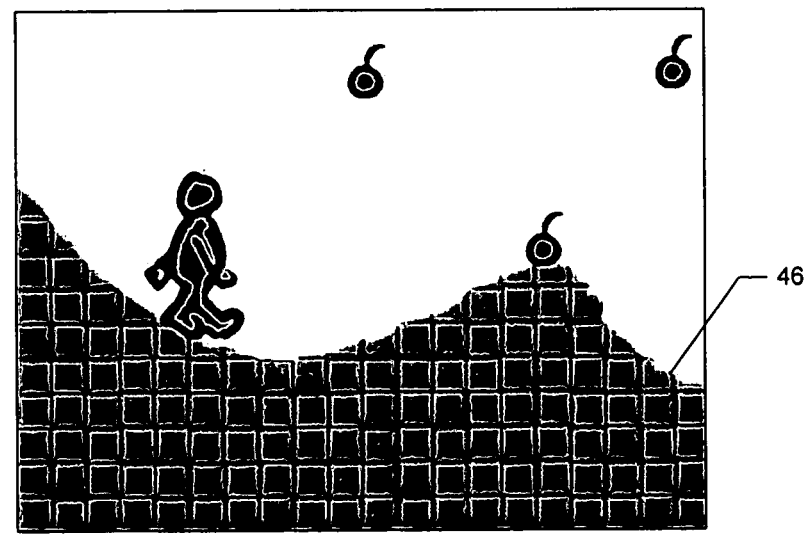

Referring now to FIGS. 3A and 3B, the customization of a platform game is illustrated, in accordance with an exemplary embodiment of the invention. A platform game is an electronic game in which the character traverses along a surface and may, for example, fight enemies or collect items along the way. The character and the surface are typically viewed from a side angle. The surface of a platform game may be customized by drawing the desired contour of the customized surface. FIG. 3A illustrates the desired contour drawn on paper as line 40. The drawn line may then be photographed with a digital camera to capture the image and create an image file. The digital camera may be integral with the gaming device, or may be a separate device. Alternatively, an image file that includes line 40 could be created using a digital pen or drafting software. Line 40 may then be identified and extracted from the image file. A feature extraction rule database, which may be associated with the platform game to be customized, may be used to identify line 40 as a feature that may be used to customize the surface of the game. For example, the feature extraction rule database may indicate that a generally horizontal line may be used to customize the surface.

The parameters of line 40, such as the position, length, and shape, may then be determined. The parameters of line 40 may then be mapped to the surface of the platform game such that the shape of the surface would correspond to the shape of line 40, advantageously providing a customized surface and a different game-playing experience. An object database may be used by the processor to map an extracted feature, such as line 40, to a corresponding object in the game. FIG. 3B illustrates the customized platform game in which the surface 46 has been customized to correspond to the shape of line 40. (Only a portion of surface 46 is visible in FIG. 3B, and the rest of surface 46 would typically scroll into view as the game progresses.) The shape of the visible portion of surface 46 of FIG. 3B corresponds to the shape of the portion of line 40 highlighted within rectangle 42 of FIG. 3A.

Figure 4A:
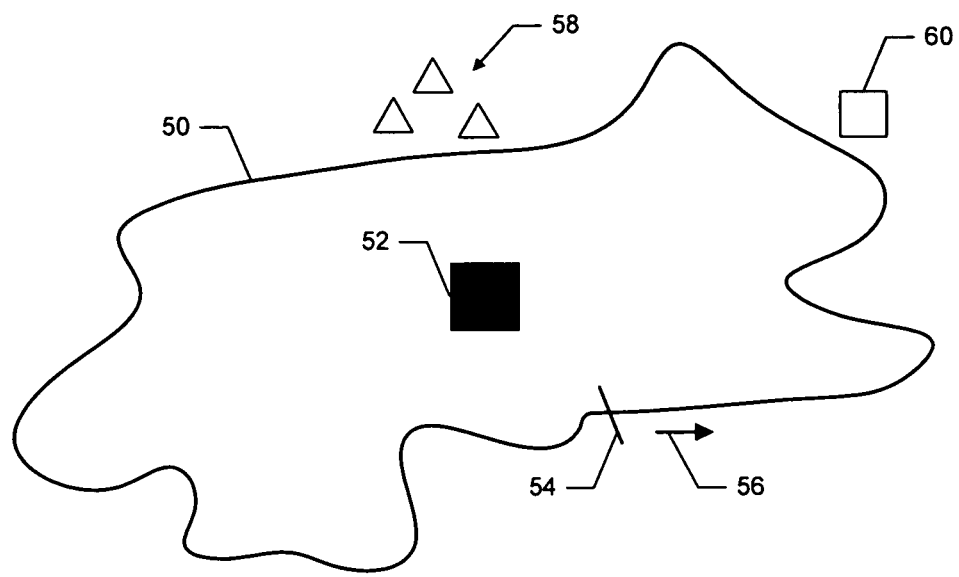
FIGS. 4A and 4B illustrate customization of a rally (i.e., racing) game, in accordance with an exemplary embodiment of the invention.
Figure 4B:
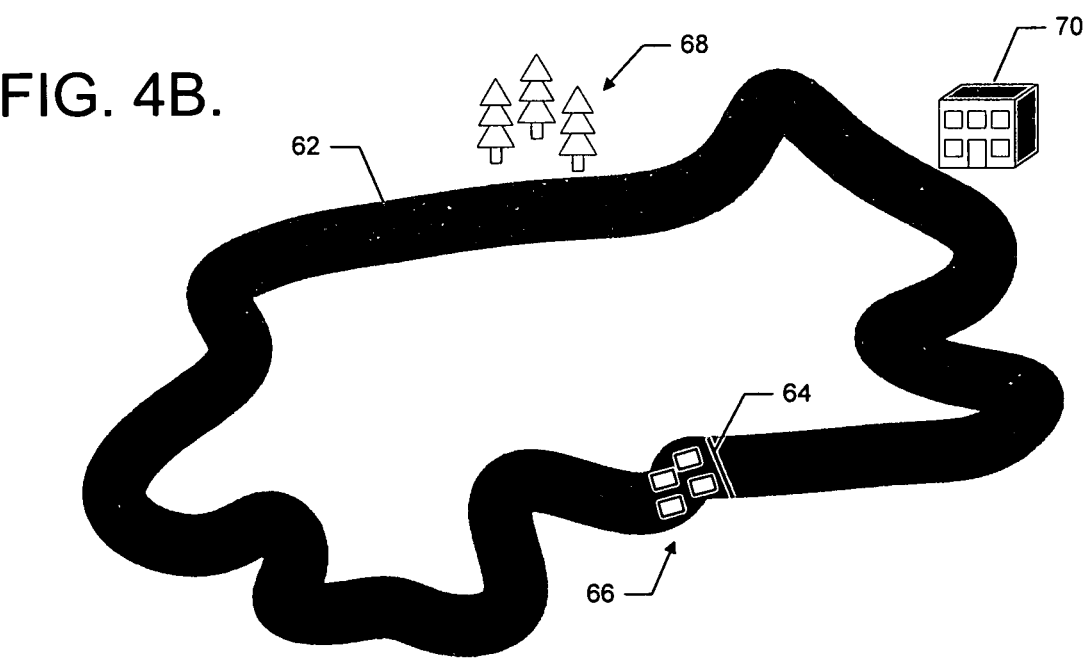

Referring now to FIGS. 4A and 4B, the customization of a rally (i.e., racing) game is illustrated, in accordance with an exemplary embodiment of the invention. Many features of a rally game may be customized, such as the shape and contour of the racetrack and the scenery (e.g., buildings, trees, signs, etc.) surrounding the racetrack, to enable a user to change the game-playing experience. Using various shapes and symbols that may be predefined in the feature extraction rule database, the user may draw the desired racetrack and scenery on paper, as illustrated in FIG. 4A. Various methods may be used to enable the user to indicate the desired shape and contour of the racetrack. For example, the user may draw a continuous line, such as line 50, forming a closed area around a solid square, such as element 52, to indicate the desired shape of the racetrack. The location of solid square 52 may indicate the desired center of the racetrack, the size of solid square 52 may indicate the desired scale of the racetrack (e.g., each side of the square may represent one kilometer), and the orientation of solid square 52 may indicate the desired orientation of the racetrack. The desired contour (i.e., elevation) of the racetrack may be indicated by the thickness of the continuous line, such that thicker segments of the line indicate a higher desired racetrack elevation. The user may indicate the desired start/finish line by drawing a small line, such as line 54, orthogonally intersecting the continuous line. The user may indicate the desired direction of travel of the cars on the racetrack by drawing a small arrow, such as arrow 56, parallel to the continuous line and proximate to the desired start/finish line. The user may indicate desired scenery, such as trees (indicated by triangles 58) and buildings (indicated by square 60). The size of the predefined shapes and symbols may correspond to the size of the scenery added to the game. Other scenery elements may be indicated by various other shapes, with various attributes of the shapes (e.g., line thickness, line continuity, fill, enclosed letters and/or numbers, etc.) indicating desired attributes of the scenery to be added to the game (size, type of material, color, etc.).

When the user has completed a drawing indicating the desired customization of the racetrack and scenery, the user would typically photograph the drawing using a digital camera to capture the image and create an image file. Alternatively, an image file that includes a drawing of the desired racetrack and scenery could be created using a digital pen or drafting software. The image file may be preprocessed, as discussed above, as necessary to enable the features to be identified. The features in the image file, such as line 50, solid square 52, etc., may then be identified using a feature extraction rule database and extracted from the image file.

The parameters of the extracted features, such as the position, length, thickness, pattern, and shape, may then be determined. The parameters of the extracted features may then be mapped to the objects of the rally game, typically using an object database that defines the relationships between extracted features and game objects. FIG. 4B illustrates the customized rally game in which the game objects of FIG. 4B have been customized to correspond to the extracted features of FIG. 4A, advantageously providing a customized racetrack and a different game-playing experience. As such, line 50 of FIG. 4A has been mapped to the racetrack 62 of FIG. 4B, line 54 has been mapped to starting line 64, arrow 56 has been used to set the direction of travel of the cars 66 on the racetrack, triangles 58 have been mapped to trees 68, and square 60 has been mapped to building 70.

Figure 5A:
FIGS. 5A and 5B illustrate customization of a surface of a game, in accordance with an exemplary embodiment of the invention.
Figure 5B:
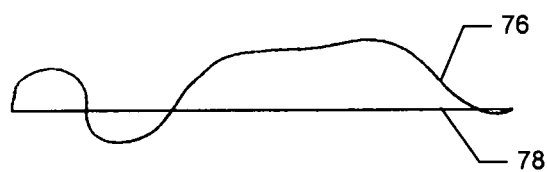

The racetrack 62 illustrated in FIG. 4B would typically have a uniform elevation because line 50 has a uniform thickness. However, racetrack 62 could have been customized to have a varied elevation if line 50 had been drawn with a varied thickness. An alternative method of customizing the elevation of racetrack 62, or any game surface, is illustrated in FIGS. 5A and 5B. FIG. 5A illustrates how any flexible item (a computer cable in this illustration) may be used to determine a customized elevation. The flexible item 74 would typically be arranged on a horizontal surface and configured in a gently curving position. The flexible item may then be photographed with a digital camera to capture the image and create an image file. The line 76 may then be extracted from the image file. The line may be cropped and rotated as necessary to make the starting and ending levels vertically aligned (as shown in FIG. 5B relative to zero elevation line 78). Line 76 may then be mapped to the surface of racetrack 62, such that the elevation of racetrack 62 may conform to the contour of line 76. An alternative to using a flexible item to determine a customized elevation, as discussed above, is to use a drawn line. A user may draw a curving line and photograph the drawing, such that the line may be extracted from the created image and mapped to the racetrack elevation.

The image file created by a user may be transferred to other users, using any suitable data transfer technique, such that the other users may customize a game using the same image file. However, it may be difficult for two or more different users to create identical customizations, even when using the same image file to create the customizations. As such, after the user has customized a game according to an embodiment of the invention, the user may store and/or transfer the customizations (e.g., customized game map, object, or character) to other users such that the other users may play the game as customized by the first user. The customizations may be stored and/or transferred using various techniques. For example, the original image file and the actions performed and/or selections made by the user to create a customization from the original image file may be stored and transferred. Alternatively, game parameters that correspond to the created customizations (e.g., customized game maps, objects, and/or characters) may be extracted and transferred to other users. As such, other users may play the game using the same game customizations created by another user.

The method for customizing functionality of an electronic game may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device, such as memory 14, and executed by an associated processing unit, such as the processor 12.

In this regard, FIG. 2 is a flowchart of methods and program products according to the invention. It will be understood that each step of the flowchart, and combinations of steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to-perform at least the following:
   facilitate receipt of a plurality of image files;
   extract at least one feature from each of the received image files to obtain a plurality of extracted features, wherein each of the plurality of extracted features are identified, located, and extracted, by the processor, based on at least one cross-referenced feature;
   determine at least one object that corresponds to the at least one cross-referenced feature, wherein the at least one object is associated with an electronic game and is determined from an object database that maps the at least one object to the at least one cross-referenced feature;
   map at least one of the plurality of extracted features to the at least one object; and
   modify the game play based on the mapped extracted feature, wherein the game play is associated with one or more functionalities of the game, and
   wherein the game play is modified by adding the at least one mapped object to the game and the at least one object did not previously exist in the game.

2. The apparatus of claim 1, wherein the at least one memory and the computer program code are configured to, with the at least one processor, cause the apparatus to select, randomly between the at least one extracted feature and another extracted feature that corresponds to the at least one cross-referenced feature of the at least one object.

3. The apparatus of claim 1, wherein the at least one memory and the computer program code are configured to, with the at least one processor, cause the apparatus to modify the electronic game by modifying a game object based on at least one of the extracted features.

4. The apparatus of claim 1, further comprising an image capture device configured to create at least one of the image files.

5. The apparatus of claim 1, further comprising a communication interface configured to facilitate receipt of at least one of the image files from an external device.

6. The apparatus of claim 1, wherein the at least one memory and the computer program code are configured to, with the at least one processor, cause the apparatus to preprocess at least one of the image files, wherein preprocess the at least one image file comprises at least one of changing from color to black and white, adjusting contrast, adjusting brightness, filtering, scaling, rotating, creating a mirror image, and creating a negative image.

7. The apparatus of claim 1, wherein the at least one memory and the computer program code are configured to, with the at least one processor, cause the apparatus to facilitate storage of a modification of the electronic game.

8. The apparatus of claim 1, wherein the at least one memory and the computer program code are configured to, with the at least one processor, cause the apparatus to facilitate transfer of a modification of the electronic game to another gaming device.

9. The apparatus of claim 1, wherein the at least one memory and the computer program code are configured to, with the at least one processor, cause the apparatus to facilitate usage of an error correction function to extract at least one feature in response to being unable to locate a desired feature within at least one of the image files.

10. The apparatus of claim 1, wherein the at least one memory and the computer program code are configured to, with the at least one processor, cause the apparatus to facilitate selection of one feature to extract when at least one of the image files comprises two or more extractable features.

11. The apparatus of claim 10, wherein the at least one memory and the computer program code are configured to, with the at least one processor, cause the apparatus to facilitate usage of input from a user to select the one feature to extract.

12. The apparatus of claim 1, wherein the at least one memory and the computer program code are configured to, with the at least one processor, cause the apparatus to modify the corresponding object in response to selecting a respective one of the extracted features.

13. The apparatus of claim 1, wherein the apparatus is caused to:
   facilitate usage of a different image file, among the image files, to customize one or more levels of play of the game.

14. The apparatus of claim 1, wherein the same extracted feature is used for multiple objects of the plurality of objects.

15. The apparatus of claim 1, wherein the object database includes parameters of the plurality of extracted features, and maps the plurality of extracted features to the at least one object based on the parameters.

16. A non-transitory computer-readable storage medium carrying one or more sequences of one or more instructions which, when executed by one or more processors, cause an apparatus to at least perform the following steps:

facilitate receipt of a plurality of image files;

extract at least one feature from each of the received image files to obtain a plurality of extracted features, wherein each of the plurality of extracted features are identified, located, and extracted, by the processor, based on at least one cross-referenced feature;

determine at least one object that corresponds to the at least one cross-referenced feature, wherein the at least one object is associated with an electronic game and is determined from an object database that maps the at least one object to the at least one cross-referenced feature;

map at least one of the plurality of extracted features to the at least one object; and modify the game play based on the mapped extracted feature, wherein the game play is associated with one or more functionalities of the game, and wherein the game play is modified by adding the at least one mapped object to the game and the at least one object did not previously exist in the game.

17. The computer-readable storage medium of claim 16, wherein the apparatus is caused to-further perform:

select, randomly between the at least one extracted feature and another extracted feature that corresponds to the at least one cross-referenced feature of the at least one object.

18. The computer-readable storage medium of claim 16, wherein the apparatus is caused to further perform:

modify the electronic game by modifying a game object based on at least one of the extracted features.

19. The computer-readable storage medium of claim 16, wherein the apparatus is caused to further perform:

facilitate election of at least one of the extracted features from the group comprising shape, size, location, angle, viewing angle, orientation, color, brightness, and contrast.

20. The computer-readable storage medium of claim 16, wherein the apparatus is caused to-further perform:

preprocess at least one of the image filed by performing at least one of changing from color to black and white, adjusting contrast, adjusting brightness, filtering, scaling, rotating, creating a mirror image, and creating a negative image.

21. The computer-readable storage medium of claim 16, further wherein the apparatus is caused to-further perform:

facilitate storage of a modification of the electronic game.

22. The computer-readable storage medium of claim 16, further wherein the apparatus is caused to further perform:

facilitate transfer of a modification of the electronic game to another gaming device.

23. The computer-readable storage medium of claim 16, wherein the apparatus is caused to further perform:

facilitate usage of an error correction function to extract at least one feature when a desired feature cannot be located within at least one of the image files.

24. The computer-readable storage medium of claim 16, further wherein the apparatus is caused to further perform:

facilitate selection of one feature to extract when at least one of the image files comprises two or more extractable features.

25. The computer-readable storage medium of claim 24, wherein the apparatus is caused to further perform:

facilitate usage of input from a user to select the one feature to extract.

26. The computer-readable storage medium of claim 16, further wherein the apparatus is caused to further perform:

modify the corresponding object in response to selecting a respective one of the extracted features.

27. The computer-readable storage medium of claim 16, wherein the apparatus is caused to further perform:

facilitate usage of a different image file, among the image files, to customized one or more levels of play of the game.

28. A method comprising:

facilitating receipt of a plurality of image files;

extracting at least one feature from each of the received image files to obtain a plurality of extracted features, wherein each of the plurality of extracted features are identified, located, and extracted, by the processor, based on at least one cross-referenced feature;

determining at least one object that corresponds to the at least one cross-referenced feature, wherein the at least one object is associated with an electronic game and is determined from an object database that maps the at least one object to the at least one cross-referenced features;

mapping at least one of the plurality of extracted features to the at least one object; and modifying, via the processor, the game play based on the extracted feature, wherein the game play is associated with one or more functionalities of the game, and wherein the game play is modified by adding the at least one mapped object to the game and the at least one object did not previously exist in the game.

29. The method of claim 28, further comprising modifying the corresponding object in response to selecting a respective one of the extracted features.

30. The method of claim 28, further comprising facilitating usage of an error correction function to extract at least one features when a desired feature cannot be located within at least one of the image files.

31. The method of claim 28, further comprising selecting one feature to extract when at least one of the image filed comprises two or more extractable features.

32. The method of claim 28, further comprising facilitating usage of a different image file, among the image files, to customize one or more levels of play of the game.

* * * * *